(12) United States Patent
Kreidler et al.

(10) Patent No.: US 8,803,387 B2
(45) Date of Patent: Aug. 12, 2014

(54) INTERFACE MODULE AND METHOD FOR COMMUNICATING WITH AN ELECTRIC MACHINE

(75) Inventors: Jason Jon Kreidler, Sheboygan Falls, WI (US); Stephen A. Zavodny, Fort Wayne, IN (US); Jared D. Zumstein, Fort Wayne, IN (US); Justin Mathew, Racine, WI (US)

(73) Assignee: Regal Beloit America, Inc., Beloit, WI (US)

( * ) Notice: Subject to any disclaimer, the term of this patent is extended or adjusted under 35 U.S.C. 154(b) by 78 days.

(21) Appl. No.: 13/401,157

(22) Filed: Feb. 21, 2012

(65) Prior Publication Data

US 2013/0214651 A1    Aug. 22, 2013

(51) Int. Cl.
*H02K 11/00* (2006.01)

(52) U.S. Cl.
USPC ........................................ 310/68 R

(58) Field of Classification Search
USPC ................... 310/89, 67 R, 64, 68 B
See application file for complete search history.

(56) References Cited

U.S. PATENT DOCUMENTS

| | | | | |
|---|---|---|---|---|
| 4,086,519 A | * | 4/1978 | Persson | 318/400.38 |
| 4,698,576 A | * | 10/1987 | Maresca | 318/687 |
| 5,006,744 A | * | 4/1991 | Archer et al. | 310/89 |
| 5,939,807 A | * | 8/1999 | Patyk et al. | 310/89 |
| 6,170,241 B1 | | 1/2001 | Shibilski et al. | |
| 7,392,565 B2 | * | 7/2008 | Holbrook et al. | 15/250.27 |
| 7,471,019 B2 | * | 12/2008 | Motherway | 310/16 |
| 2007/0012052 A1 | | 1/2007 | Butler et al. | |
| 2007/0078614 A1 | | 4/2007 | Discenzo et al. | |
| 2009/0055026 A1 | | 2/2009 | Ha et al. | |
| 2009/0122502 A1 | | 5/2009 | Baran et al. | |
| 2010/0013900 A1 | | 1/2010 | Silverbrook et al. | |

* cited by examiner

*Primary Examiner* — Dang Le (74) *Attorney, Agent, or Firm* — Armstrong Teasdale LLP (57) ABSTRACT

An electric machine that includes a machine housing, a stator positioned at least partially within the machine housing and comprising a plurality of stator windings, a rotor positioned at least partially within the machine housing and configured to rotate with respect to the stator, and a motor controller configured to selectively provide power to the plurality of stator windings is described. The electric machine also includes an interface module configured for coupling to the motor controller. The interface module includes a processing device, a first communication interface coupled to the processing device and configured for coupling with the motor controller, and a second communication interface coupled to the processing device and configured to receive a control signal.

24 Claims, 5 Drawing Sheets

INTERFACE MODULE AND METHOD FOR COMMUNICATING WITH AN ELECTRIC MACHINE

BACKGROUND OF THE INVENTION

The embodiments described herein relate generally to an electric machine, and more specifically, to an electric machine that includes an expansion communication module.

An electric motor controller, which may also be referred to as a motor drive, may include a communication interface used to, for example, program the motor controller, provide the motor controller with information from a sensor, and/or receive diagnostics information from the motor. The communication interface may include a serial port that allows for serial communication between the motor controller and a computer coupled to the serial port. However, a new motor controller must be designed and installed if any other type of communication with the electric motor is desired. The length of the development cycle and costs associated with designing and field testing a new motor controller may prohibit designing and field testing a new motor controller when a customer desires a new or advanced interface to an electric motor.

BRIEF DESCRIPTION OF THE INVENTION

In one aspect, an electric machine is provided that includes a machine housing, a stator positioned at least partially within the machine housing and comprising a plurality of stator windings, a rotor positioned at least partially within the machine housing and configured to rotate with respect to the stator, and a motor controller configured to selectively provide power to the plurality of stator windings. The electric machine also includes an interface module configured for coupling to the motor controller. The interface module includes a processing device, a first communication interface coupled to the processing device and configured for coupling with the motor controller, and a second communication interface coupled to the processing device and configured to receive a control signal.

In another aspect, an interface module configured to be releaseably coupled to an electric machine is provided. The interface module includes a processing device, a first communication interface coupled to the processing device and configured for coupling with a motor controller of the electric machine, and a second communication interface coupled to the processing device and configured to receive a control signal.

In yet another aspect, a method for communicating with a motor controller that includes a serial communication interface is provided. The method includes coupling an interface module to the serial communication interface of the motor controller, configuring the interface module to receive an input signal, and configuring the interface module to convert the input signal into a control signal for transmission to the motor controller.

DETAILED DESCRIPTION OF THE INVENTION

The methods and systems described herein facilitate expanding control capabilities of an electric motor without replacing the motor controller. The capabilities may include, for example, communication capabilities. As described herein, an interface module may be integrated directly onto/into an existing electric motor and control circuit assembly, even in the field, to expand the available motor communications and control interfaces and optionally provide control of the electric motor and control circuit assembly.

Technical effects of the methods and systems described herein include at least one of: (a) coupling an interface module to a communication interface of a motor controller; (b) configuring the interface module to receive an input signal; and (c) configuring the interface module to convert the input signal into a control signal for transmission to the motor controller.

Figure 1:
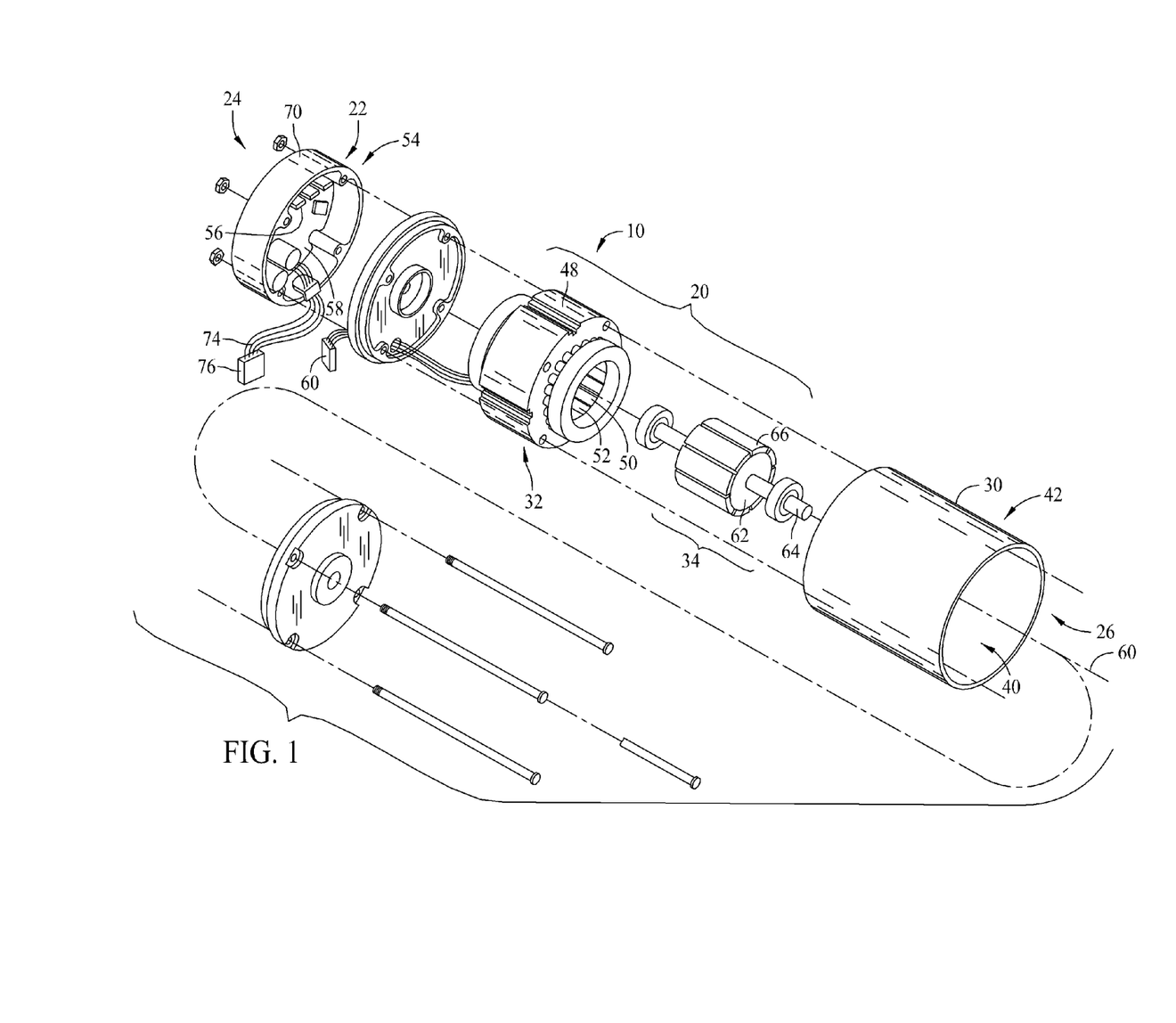
FIG. 1 is a perspective cut-away view of an exemplary electric machine.

FIG. 1 is an exploded view of an exemplary electric motor and control circuit assembly 10. In the exemplary embodiment, assembly 10 includes an electric machine 20 and a motor controller 22. Although electric machine 20 is referred to herein as an electric motor, electric machine 20 can be operated as either a generator or a motor. Electric motor 20 includes a first end 24 and a second end 26. Electric motor 20 further includes a motor assembly housing 30, a stationary assembly 32, and a rotatable assembly 34. Motor assembly housing 30 defines an interior 40 and an exterior 42 of motor 20 and is configured to at least partially enclose and protect stationary assembly 32 and rotatable assembly 34. Stationary assembly 32 includes a stator core 48, which includes a plurality of stator teeth 50 and a plurality of winding stages 52 wound around stator teeth 50 and adapted to be electronically energized to generate an electromagnetic field. In the exemplary embodiment, motor controller 22 includes a plurality of electronic components 54 and a connector 56 mounted on a component board 58, such as a printed circuit board. Motor controller 22 is connected to winding stages 52 by interconnecting connector 56 and connector 60. In the exemplary embodiment, motor controller 22 includes a variable frequency drive that provides a signal, for example, a pulse width modulated (PWM) signal, to electric motor 20. In an alternative embodiment, motor controller 22 may be configured to apply a voltage to one or more of winding stages 52 at a time for commutating winding stages 52 in a preselected sequence to rotate rotatable assembly 34 about an axis of rotation 60.

In the exemplary embodiment, rotatable assembly 34 includes a permanent magnet rotor core 62 and a shaft 64. In the exemplary embodiment, rotor core 62 is formed from a stack of laminations made of a magnetically permeable material and is substantially received in a central bore of stator core 48. A plurality of permanent magnets 66 are secured to rotor core 62. Rotor core 62 and stator core 48 are illustrated as being solid in FIG. 1 for simplicity, their construction being well known to those of ordinary skill in the art. Furthermore, while FIG. 1 is an illustration of a three phase electric motor, the methods and apparatus described herein may be included within motors having any number of phases, including single phase and multiple phase electric motors. Moreover, in the exemplary embodiment, electric motor 20 is an electronically commutated motor, sometimes referred to as an ECM. Examples of electronically commutated motors include, but are not limited to, brushless DC motors, brushless AC motors, and reluctance motors.

In the exemplary embodiment, electric motor 20 is coupled to a work component (not shown in FIG. 1) included within a commercial and/or industrial application. The work component may include, but is not limited to, a pump system, an air handling unit, and/or manufacturing machinery (e.g., conveyors and/or presses). In such applications, motor 20 may be rated at, for example only, three horsepower (hp) to sixty hp. In an alternative embodiment, the work component may include a fan for moving air through an air handling system, for blowing air over cooling coils, and/or for driving a compressor within an air conditioning/refrigeration system. More specifically, motor 20 may be used in air moving applications used in the heating, ventilation, and air conditioning (HVAC) industry, for example, in residential applications using ⅓ horsepower (hp) to 1 hp motors. Although described herein using the above examples, electric motor 20 may engage any suitable work component and be configured to drive such a work component.

Assembly 10 further includes a cap 70 which is mounted at first end 24 of assembly 10 to enclose motor controller 22 at least partially within cap 70. A wiring harness 74 and a connector 76 are utilized to connect motor assembly 10 to an electrical power source.

Figure 2:
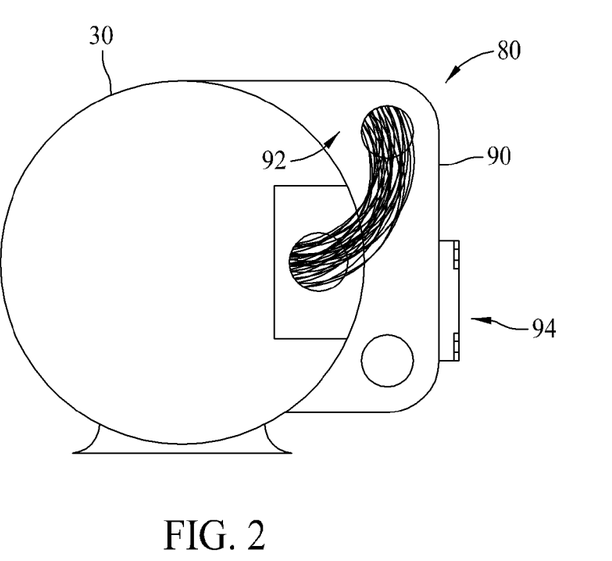
FIG. 2 is a rear view of an interface module coupled to, or included within, a machine housing of the electric machine shown in FIG. 1.
Figure 3:
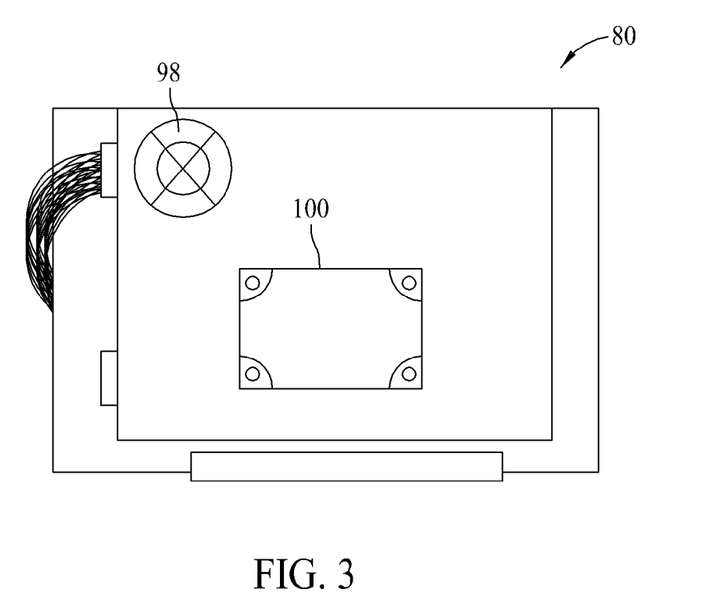
FIG. 3 is a side view of the interface module and machine housing shown in FIG. 2.

FIG. 2 is a rear view of an interface module assembly 80 coupled to machine housing 30 (shown in FIG. 1). FIG. 3 is a side view of interface module assembly 80 (shown in FIG. 2). In the exemplary embodiment, interface module assembly 80 is coupled to a conduit box (not shown in FIG. 2 or 3) included in machine housing 30 and provides access from exterior 42 to interior 40 of machine housing 30. For example, interface module assembly 80 may replace a conduit cover (not shown in FIG. 2 or 3) and may be coupled to the conduit box using connectors formerly used to couple the conduit cover to the conduit box.

In the exemplary embodiment, interface module assembly 80 includes an interface module (shown in FIG. 4) and a housing 90. Housing 90 defines an interior 92 and an exterior 94 of interface module assembly 80. Interface module assembly 80 may also include a cooling device, for example, but not limited to, a cooling fan 98. Cooling fan 98 extracts heat from interior 92 of housing 90. In the exemplary embodiment, interface module assembly 80 also includes a communication interface 100.

Figure 4:
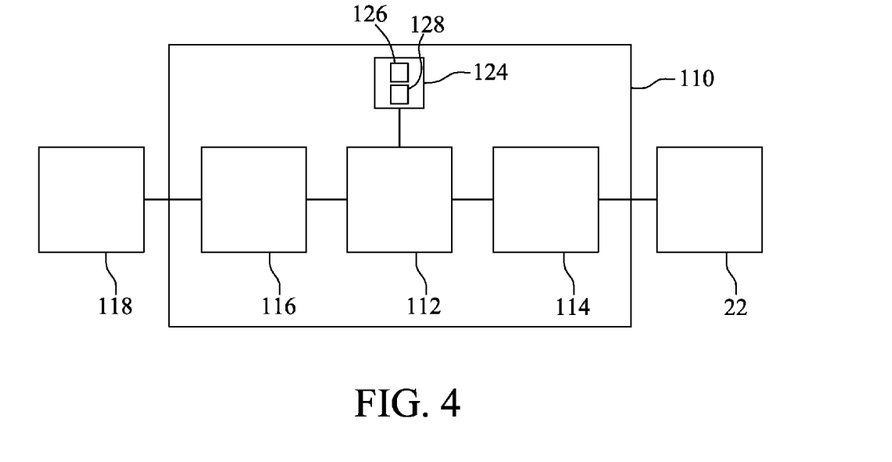
FIG. 4 is a block diagram of the exemplary interface module shown in FIG. 3.

FIG. 4 is a block diagram of an exemplary interface module 110 that may be included within interface module assembly 80 (shown in FIGS. 2 and 3). In the exemplary embodiment, interface module 110 includes components mounted to a printed circuit board and positioned at least partially within interface module housing 90. In the exemplary embodiment, interface module 110 includes a processing device 112, a first communication interface 114, and a second communication interface 116. In the exemplary embodiment, first communication interface 114 is coupled to processing device 112 and configured for coupling with motor controller 22 (shown in FIG. 1). Second communication interface 116 is coupled to processing device 112 and configured to receive a control signal.

The term processing device, as used herein, refers to central processing units, microprocessors, microcontrollers, reduced instruction set circuits (RISC), application specific integrated circuits (ASIC), logic circuits, and any other circuit or processor capable of executing the functions described herein.

It should be noted that the embodiments described herein are not limited to any particular processor for performing the processing tasks of the invention. The term "processor," as that term is used herein, is intended to denote any machine capable of performing the calculations, or computations, necessary to perform the tasks of the invention. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks described herein, as will be understood by those skilled in the art.

Second communication interface 116 may include an RS-485 connector, a digital serial interface (DSI) connector, a control wire reception terminal, and/or any other type of interface that allows a user to provide a control signal to interface module 110. For example, the control signal may include a 0-10 volts direct current (VDC) control signal, a 0-5 VDC control signal, a 4-20 milliampere (mA) control signal, and/or any other type of control signal that allows interface module 110 to function as described herein. In some embodiments, second communication interface 116 is communicatively coupled to an input/output device 118 configured to receive a user input and to display motor operating information, for example, using a graphical user interface. For example, input/output device 118 may include, but is not limited to, a touch screen display and/or any other type of input/output device that allows interface module 110 to function as described herein.

Alternatively, input/output device 118 may include a speed control input device. The speed control input device may include an analog potentiometer configured to receive a speed control input from a user. In the exemplary embodiment, input/output device 118 is physically coupled to motor housing 30 and/or interface housing 90. However, in alternative embodiments, input/output device 118 may be communicatively coupled to second communication interface 116 and positioned remotely from interface module assembly 80.

In the exemplary embodiment, interface module 110 also includes a memory device 124. Memory device 124 may be included within processing device 112, or may be coupled to processing device 112. In the exemplary embodiment, memory device 124 stores a plurality of different communications protocols, including at least a first communication protocol 126 and a second communication protocol 128. For example, processing device 112 may access the communications protocols stored in memory device 124 in order to translate a signal received from a user via the second communication interface 116 into a format that may be transmitted to motor controller 22. More specifically, processing device 112 may receive a signal sent using an Ethernet protocol, in which motor controller 22 may not be compatible. Processing device 112 translates the received signal to a serial communication able to be transmitted to motor controller 22. Memory device 124 may also store additional functionality to change operation of electric motor 20 without replacing said motor controller 22. For example, processing device 112 may control motor 20 in accordance with a user defined proportional-integral-derivative (PID) control architecture stored within memory device 124.

Figure 5:
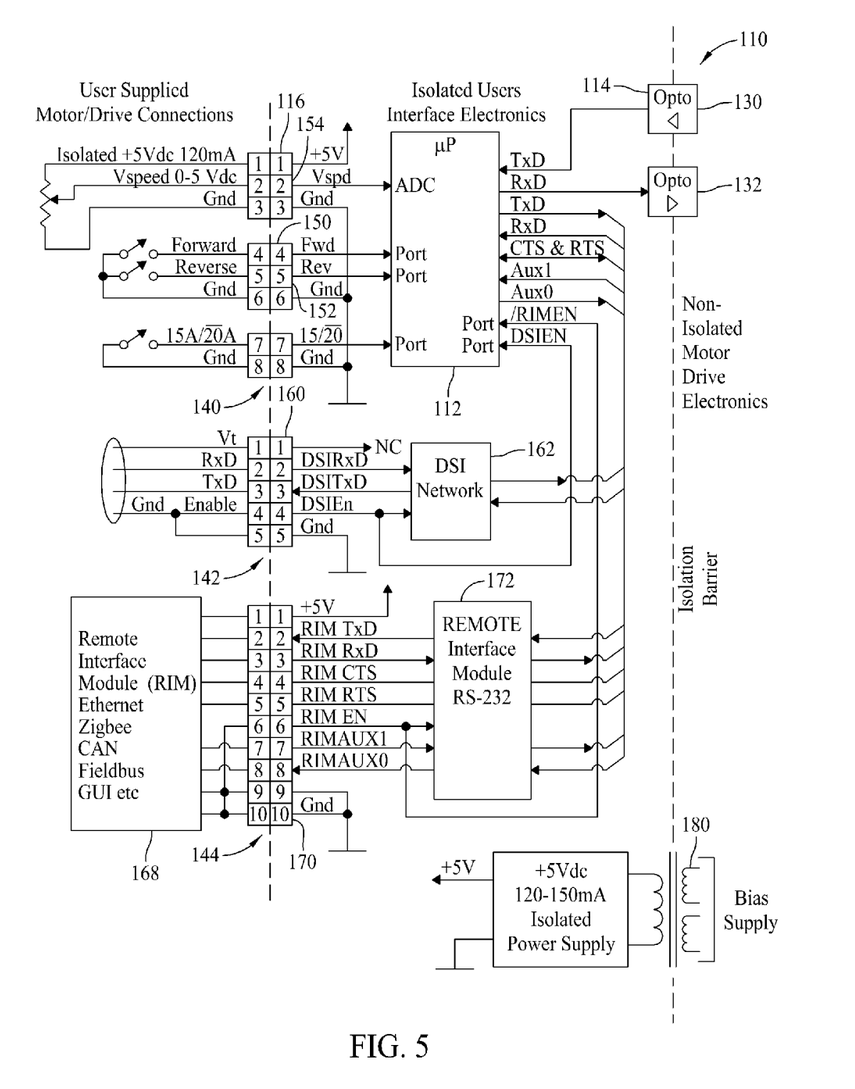
FIG. 5 is a circuit diagram of the exemplary interface module shown in FIG. 4.

FIG. 5 is a circuit diagram of an exemplary embodiment of interface module 110 (shown in FIG. 4). In the exemplary embodiment, first communication interface 114 includes a first optocoupler 130 and a second optocoupler 132. First and second optocouplers 130 and 132 electrically isolate interface module 110 from motor controller 22. First optocoupler 130 allows motor controller 22 to transmit a signal to processing device 112 and second optocoupler 132 allows processing device 112 to transmit a signal to motor controller 22.

In the exemplary embodiment, communication interface 116 includes multiple types of interfaces. Although described as specifically including three types of interfaces, communication interface 116 may include a single type of interface and/or any number of types of interfaces that allows interface module 110 to function as described herein. In the exemplary embodiment, communication interface 116 includes a basic motor interface 140, a DSI interface 142, and a remote interface 144.

In the exemplary embodiment, basic motor interface 140 is configured to receive voltage level signals that represent desired operation of electric motor 20. For example, basic motor interface 140 may receive a forward command signal at a first signal port 150 directing electric motor 20 to operate in what is defined as a forward direction. Basic motor interface 140 may also receive a reverse command signal at a second signal port 152 directing electric motor 20 to operate in what is defined as a reverse direction. Basic motor interface 140 may also receive a speed control command signal at a third signal port 154. For example, the speed control command signal provided to third signal port 154 may vary in voltage from 0 to 5 volts, with a higher voltage corresponding to a higher electric motor operating speed.

In the exemplary embodiment, DSI interface 142 is configured to receive a DSI signal. In the exemplary embodiment, DSI interface 142 includes a DSI connector 160 and a DSI network adapter 162 configured to interface between DSI connector 160 and processing device 112.

Furthermore, in the exemplary embodiment, remote interface 144 is configured to receive an operating signal from a remote interface device 168. More specifically, remote interface 144 may be configured for coupling with remote interface device 168. In the exemplary embodiment, remote interface device 168 is configured to communicate with a user using Ethernet, Zigbee, CAN, Field bus, a GUI, and or any other communication standard/device that allows interface module 110 to function as described herein. Wireless components may be configured to use wireless standards including, but not limited to, 2G, 3G, and 4G cellular standards such as LTE, EDGE, and GPRS, IEEE 802.16 Wi-Max, IEEE 802.15 ZigBee®, Bluetooth, IEEE 802.11 standards including 802.11a, 802.11b, 802.11d, 802.11e, 802.11g, 802.11h, 802.11i, 802.11j, and 802.11n, Wi-Fi®, and proprietary standards such as Z-Wave®. Wi-Fi® is a certification mark developed by the Wi-Fi Alliance, Inc. of Austin, Tex., ZigBee® is a registered trademark of ZigBee Alliance, Inc. of San Ramon, Calif., and Z-Wave® is a registered trademark of Sigma Designs, Inc. of Milpitas, Calif. In the exemplary embodiment, remote interface 144 includes a remote interface connector 170 and a remote interface adapter 172. Remote interface adapter 172 includes drivers used to communicate between processing device 112 and remote interface device 168.

Moreover, in the exemplary embodiment, interface module 110 receives power, and provides the power to motor controller 22 for operation of motor controller 22. For example, interface module 110 may receive +5 volts DC and provide it to motor controller 22 through use of a transformer 180.

Figure 6:
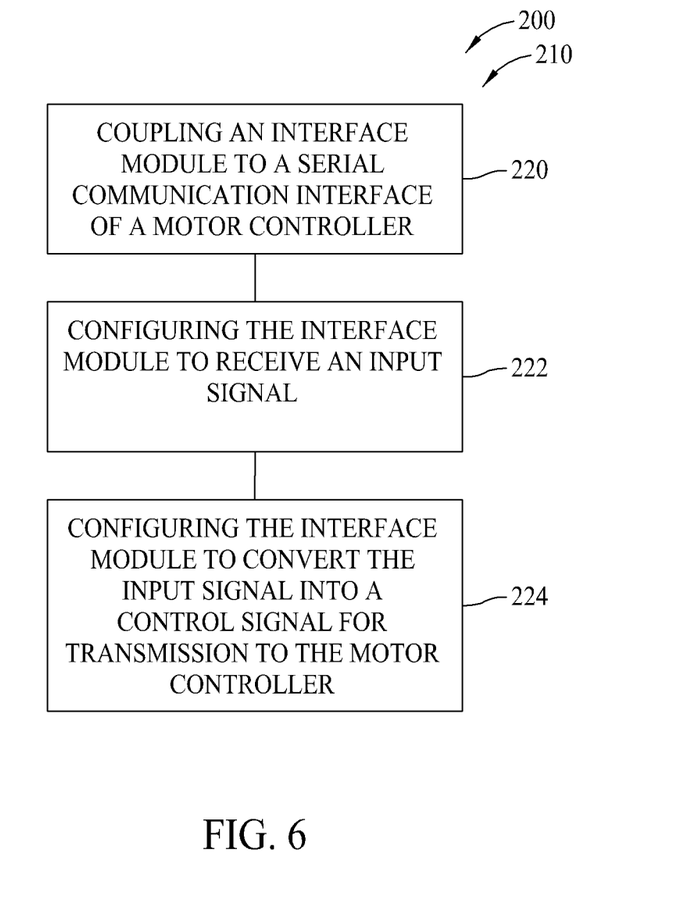
FIG. 6 is a flow chart of an exemplary method for communicating with a motor controller.

FIG. 6 is a flow chart 200 of an exemplary method 210 for communicating with a motor controller, for example, motor controller 22 (shown in FIG. 1). In the exemplary embodiment, method 210 includes coupling 220 an interface module, for example, interface module 110 (shown in FIG. 5) to a serial communication interface of the motor controller, for example, motor controller 22 (shown in FIG. 1). Method 210 may also include configuring 222 interface module 110 to receive an input signal. In the exemplary embodiment, interface module 110 is configured to receive a signal via at least one of an RS-485 connector and a digital serial interface (DSI) connector. Furthermore, interface module 110 may be configured 222 to receive a speed control input signal from a speed control input device.

In the exemplary embodiment, method 210 also includes configuring 224 interface module 110 to convert the input signal into a control signal for transmission to motor controller 22. For example, interface module 110 may be configured 224 to generate an output signal, based on the received input signal, in a format understandable by motor controller 22. More specifically, interface module 110 may convert the input signal to a signal able to be transmitted via an optocoupler, for example, optocoupler 132 (shown in FIG. 5).

Described herein are exemplary methods and systems for communicating with a motor controller. As described herein, an interface module may be mounted to an electric motor, or to any other motor-drive, by replacing an existing conduit cover on the drive housing. The interface module connects to a communication interface that provides the necessary power and communications links to the motor drive electronics.

For example, the interface module may contain a microcontroller configured to apply complex communications protocols and networking or internet connectivity. As described above, the interface module facilitates implementing future user interfaces or control functionality without changing the drive electronics or firmware of the motor controller. Therefore, new motor control functionality may be implemented without re-certifying the motor and motor controller with a certification organization, for example, Underwriters Laboratories Inc. (UL).

This restricts our entry into markets that need or require interfaces that we currently do not support. In the event that a new communications technology becomes prevalent, we experience significant loss of market share until we are able to field a UL registered drive that contains that feature set. When a customer wants new or additional control functionality there is an increase in cost that may reduce out market penetration.

Furthermore, a plurality of communications protocols and necessary software and hardware can be implemented outside of the motor controller hardware and software structure. Future applications, yet to be conceived, can be retrofitted to existing motor controllers without redesigning or replacing the motor controllers. A local, motor-mounted display may utilize a Graphical Users Interface (GUI) to display motor status information and receive control signals. Field retrofits and upgrades can be implemented with a minimum of expense and time. Customizable system level control functionality can be incorporated into the interface module including user defined PID control architectures.

The methods and systems described herein facilitate efficient and economical expansion of the communication capabilities of an electric motor. The methods and systems described herein simplify the upgrade of existing drive control and communications functionality and installation of high efficiency electronically commutated motors including BLDC/PMAC, variable reluctance, and/or any motor/drive combination so equipped, into new and existing applications by eliminating the need to rewire the application and/or add additional control devices. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric machine comprising:
a machine housing;
a stator positioned at least partially within said machine housing and comprising a plurality of stator windings;
a rotor positioned at least partially within said machine housing and configured to rotate with respect to said stator;
a motor controller configured to selectively provide power to said plurality of stator windings; and
an interface module configured for coupling to said motor controller and comprising:
a processing device,
a first communication interface coupled to said processing device and configured for coupling with said motor controller, and
a second communication interface coupled to said processing device and configured to receive a control signal, wherein said processing device is configured to receive the control signal using a first communication protocol that defines a first format for communicating data, and transmit the control signal to said motor controller using a second communication protocol that defines a second format for communicating the data, wherein the second communication protocol is different from the first communication protocol.

2. An electric machine in accordance with claim 1, wherein said interface module is included within said motor housing.

3. An electric machine in accordance with claim 1, further comprising an interface module housing configured to at least partially enclose said interface module, and wherein said motor housing comprises a conduit box and said interface module housing is configured to couple to said conduit box.

4. An electric machine in accordance with claim 1, wherein said interface module further comprises a memory device at least one of coupled to and included within said processing device, said memory device configured to store a plurality of communication protocols, including the first communication protocol and the second communication protocol.

5. An electric machine in accordance with claim 4, wherein said memory device is further configured to store additional functionality to change operation of said electric machine without replacing said motor controller.

6. An electric machine in accordance with claim 1, wherein said interface module is electrically isolated from said motor controller.

7. An electric machine in accordance with claim 1, wherein said second communication interface comprises at least one of an RS-485 connector and a digital serial interface (DSI) connector.

8. An electric machine in accordance with claim 1, wherein said second communication interface is configured to receive a speed control input signal.

9. An electric machine in accordance with claim 8, wherein said second communication interface is configured for coupling to an analog potentiometer that provides the speed control input signal.

10. An electric machine in accordance with claim 1, wherein said second communication interface is configured for coupling to a remote interface device configured to receive a user input and to display motor operating information.

11. An electric machine in accordance with claim 10, wherein said remote interface device is configured to display a graphical user interface.

12. An electric machine in accordance with claim 1, wherein said processing device is configured to operate in accordance with a user defined proportional-integral-derivative (PID) control architecture.

13. An interface module configured to be releaseably coupled to an electric machine, said interface module comprising:
a processing device;
a first communication interface coupled to said processing device and configured for coupling with a motor controller of the electric machine; and
a second communication interface coupled to said processing device and configured to receive a control signal, wherein said processing device is configured to receive the control signal using a first communication protocol that defines a first format for communicating data and transmit the control signal to the motor controller using a second communication protocol that defines a second format for communicating the data, wherein the second communication protocol is different from the first communication protocol.

14. An interface module in accordance with claim 13, further comprising a housing configured for coupling with the electric machine and for at least partially enclosing said processing device, said first communication interface, and said second communication interface.

15. An interface module in accordance with claim 13, further comprising a memory device at least one of coupled to and included within said processing device, said memory device configured to store a plurality of communication protocols, including the first communication protocol and the second communication protocol.

16. An interface module in accordance with claim 15, wherein said memory device is further configured to store additional functionality to change operation of said electric machine without replacing said motor controller.

17. An interface module in accordance with claim 13, wherein said interface module is electrically isolated from the motor controller.

18. An interface module in accordance with claim 13, wherein said second communication interface comprises at least one of an RS-485 connector and a digital serial interface (DSI) connector.

19. An interface module in accordance with claim 13, wherein said second communication interface is configured to receive a speed control input device.

20. An interface module in accordance with claim 13, wherein said second communication interface is configured for coupling with a remote interface device configured to receive a user input and to display motor operating information.

21. A method for communicating with a motor controller that includes a serial communication interface, said method comprising:
coupling an interface module to the serial communication interface of the motor controller;
configuring the interface module to receive an input signal; and
configuring the interface module to convert the input signal into a control signal for transmission to the motor controller by receiving the input signal using a first communication protocol that defines a first format for communicating data and transmitting the input signal to the motor controller as the control signal using a second communication protocol that defines a second format for communicating the data, wherein the second communication protocol is different from the first communication protocol.

22. A method in accordance with claim 21, wherein configuring the interface module to receive an input signal comprises configuring the interface module to receive a signal via at least one of an RS-485 connector and a digital serial interface (DSI) connector.

23. A method in accordance with claim 21, wherein configuring the interface module to receive an input signal comprises configuring the interface module to receive a speed control input signal.

24. A method in accordance with claim 21, further comprising electrically isolating the interface module from the motor controller.

* * * * *